Sept. 7, 1954   W. A. SCOTT   2,688,500
COUPLING FOR PIPES
Filed Jan. 2, 1952

INVENTOR.
Walter A. Scott.
BY Davis, Novice, Faithfull

UNITED STATES PATENT OFFICE 2,688,500

COUPLING FOR PIPES

Walter A. Scott, Poughkeepsie, N. Y., assignor to The De Laval Separator Company, Poughkeepsie, N. Y., a corporation of New Jersey Application January 2, 1952, Serial No. 264,505

1 Claim. (Cl. 285—129)

This invention relates to couplings for connecting pipe sections. Its principal object is to provide an improved pipe coupling which can be readily disassembled for cleaning purposes, forms a tight joint between the pipes, and accommodates out-of-roundness of the pipes without imposing undue stresses on them.

The coupling of the present invention may be used to particular advantage for coupling glass pipes, and therefore it will be described in connection with such use, for illustrative purposes. However, the new coupling may be used for coupling pipes of other material as well, such as stainless steel tubing.

In the coupling of pipes, it is common practice to insert a gasket of rubber or other elastic material between the adjacent ends of the pipes to be coupled, to form a seal at the joint between the pipe ends. These pipe ends are usually formed with enlarged externally tapered portions which are gripped and drawn together by surrounding tapered metal rings of the coupling, so as to press the pipe ends against the rubber sealing gasket. The metal rings are drawn together in any suitable manner to apply sufficient pressure between the sealing gasket and the pipe ends to form a leak-proof seal at the joint. However, the pressure of the metal rings on the pipe ends is often sufficient to cause damaging stresses on the pipe ends when they are not perfectly round, since the metal rings cannot adapt themselves to the out-of-round condition of the pipes. In the case of glass pipes, which are usually out-of-round more or less, the resulting uneven stresses thus imposed around the pipe ends is often sufficient to fracture the pipes. Attempts have been made heretofore to provide a coupling which will accommodate out-of-roundness of the pipes and at the same time effect a tight seal at the joint between the pipes; but the results of these attempts, so far as I am aware, have been far from satisfactory because they have compromised on one or both of these requirements, or have resulted in a structure which is too complicated or too difficult to assemble and disassemble.

According to the present invention, the metal rings surrounding the pipe ends are provided internally with tapers more or less complementary to the enlarged externally tapered portions of the pipe ends, which taper away from the sealing gasket between the pipes. The minimum internal diameter of each metal ring is at least as great as the maximum external diameter of the corresponding pipe end, so that the metal rings can be slipped over the ends of the corresponding pipes or removed therefrom. A frusto-conical band of resilient material is interposed between the external taper of each pipe end and the internal taper of the surrounding metal ring. These bands transmit the pressure of the metal rings to the tapered pipe ends and the sealing gasket, but they are deformable under this pressure to accommodate any out-of-roundness. Each band is split to form opposed ends and is provided intermediate its ends with a hinge, so that the band can be opened or closed by swinging its ends about the hinge. Thus, the coupling may be easily disassembled by disconnecting the metal rings from each other and sliding them apart beyond the enlarged and tapered pipe portions to the normal-diameter portions of the pipes, whereby the bands are exposed and can be removed by opening them on their hinges. The metal rings can then be slipped over the enlarged pipe ends and removed. The assembly of the coupling may be effected readily by the reverse operation.

In the preferred construction, the hinge of each resilient band is formed by providing a groove in the band extending endwise thereof from edge to edge, so that the band is weakened locally to allow the hinge action. In this way, the grooves, in addition to forming the hinges, provide escape paths for any leakage between the pipe ends and the intervening sealing gasket, so that such leakage can be more readily detected; and the opposed ends of the respective bands also form escape paths for the same purpose.

For a better understanding of the invention, reference may be had to the accompanying drawing, in which Fig. 1 is a longitudinal sectional view of a preferred form of the new coupling, showing it applied to the pipes;

Figure 1:
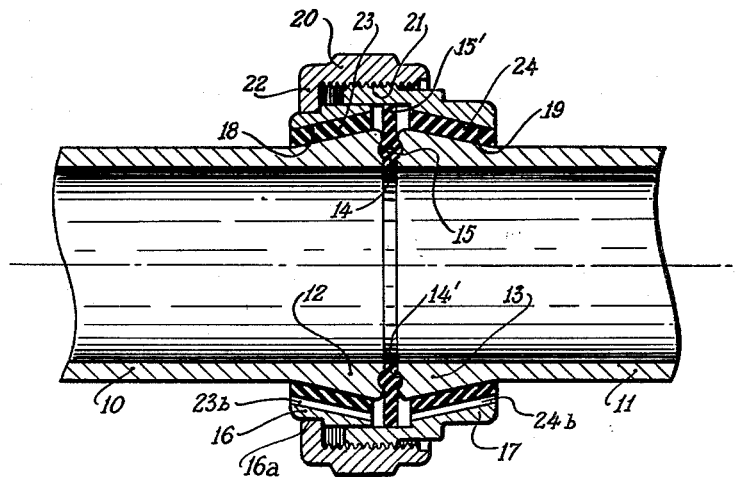

Referring to the drawing, the pipes to be coupled are shown at 10 and 11. As illustrated, the pipes are made of glass and have externally enlarged end portions 12 and 13, respectively, which are tapered. The external taper of each pipe extends away from the opposing end of the other pipe. In the opposing ends of the pipes 10 and 11 are annular recesses 14 and 14', respectively, which are semi-circular in cross-section. An annular gasket 15 of rubber or other elastic material is fitted in the recesses 14 and 14'. For ease in handling the gasket during assembly of the coupling, the gasket is provided with an outwardly extending flange 15' which protrudes radially beyond the enlargements 12 and 13. These enlargements of the pipes are surrounded by metal rings 16 and 17, respectively, the internal surfaces of which have tapers 18 and 19 which are complementary to the tapers on the pipe enlargements 12 and 13, respectively. Thus, the tapered interiors of the rings 16 and 17 form anticlinal surfaces, the larger diameter portions of which are in opposed adjacent relation. The ring 16 has a portion which fits closely in the other ring 17 and is slidable therein, and the two rings are surrounded by a nut 20 having a threaded connection 21 with the ring 17. An inwardly extending flange 22 on the nut is engaged in a circumferential notch 16a in the nut 16. Accordingly, by screwing the nut 20 in one direction on the ring 17, the two rings are drawn together, and by screwing the nut in the opposite direction the rings may be disconnected. The coupling I have described so far is conventional.

Figure 3:
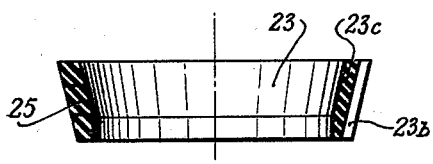
Fig. 3 is a sectional view on the line 3—3 in Fig. 2.
Figure 4:
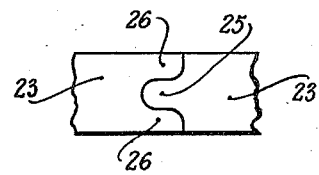
Fig. 4 is a side view of part of the band, showing its abutting ends.
Figure 2:
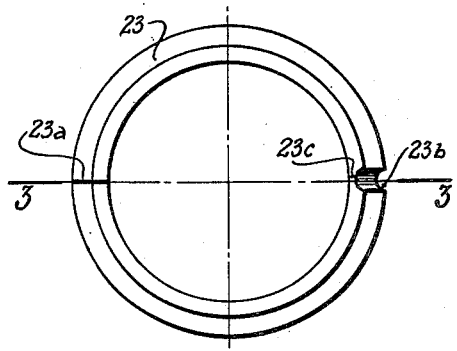
Fig. 2 is an end view of one of the resilient bands between the metal rings and the enlarged ends of the pipes, looking from the smaller end of the band.

Within the metal rings 16 and 17 are bands 23 and 24, respectively, made of a resilient material. These bands are identical in construction. As shown in Figs. 2, 3 and 4, each band is of frusto-conical shape and is split, as at 23a, to form opposing ends. Intermediate these ends the bands are formed with longitudinal grooves 23b and 24b, respectively, in their outer surfaces, the grooves extending from edge to edge of each band. In this way, the groove of each band weakens the band locally between its opposing ends and thereby forms a hinge 23c on which the band can be opened and closed. The opposed ends of each band are preferably formed with interlocking portions (Fig. 4) to maintain the continuity of the band and hold the ends in alignment. These interlocking portions may be constituted by a tongue 25 at one end fitting into the central notch formed by parts 26 on the other end.

As shown in Fig. 1, the minimum internal diameter of each ring 16 and 17 is at least as great as the maximum external diameter of the enlarged end portion 12 or 13 of the pipe which it surrounds. Accordingly, each ring can be slipped over or removed from the enlarged end of the corresponding pipe. The bands 23 and 24 fit snugly around the tapers of the pipe enlargements 12 and 13, respectively, and fill the spaces between these enlargements and the surrounding rings.

The material from which the bands 23 and 24 are made is preferably a fairly hard rubber or other semi-elastic medium. The material must be quite hard because the axial forces applied by the metal rings 16 and 17 are transmitted to the enlarged ends of the pipes solely through these bands. If the material of the bands were a soft medium, it would tend to be extruded from the smaller ends of the metal rings, and the pipes would not be drawn together with sufficient force to effect a tight seal with the sealing gasket 15. On the other hand, if the material of the bands 23 and 24 were a medium which would not deform under the pressure necessary to form a tight seal with the gasket 15, then the usual out-of-round condition of the pipes would result in undue stresses thereon which would be apt to fracture the pipes. Accordingly, the ideal medium for the resilient bands 23 and 24 is one having a minimum cold flow characteristic and which will retain its size and shape when subjected to pressures somewhat below those required to fracture the pipes, but will deform and accommodate itself to any irregularities in the enlarged ends of the pipes before a glass fracturing pressure is developed. I have found that satisfactory results can be obtained when the bands 23 and 24 are fabricated of a rubber having a Shore hardness test value of 90–95 and a specific gravity of 1.145.

When the resilient bands 23 and 24 have the preferred characteristics noted above, it is very difficult to stretch them. However, by splitting each band, as at 23a, and providing a hinge 23c intermediate the adjacent ends of the band, the band may be easily opened or closed around the corresponding pipe 10—11. Furthermore, the grooves 23b and 24b in the bands, forming the hinges, and the tongue-and-groove joints 25—26 at the adjacent ends of the bands, form escape paths for any liquid which might leak between the sealing gasket 15 and the ends of the pipe. This is a desirable feature, since it enables such leaks to be detected quickly and repaired.

It will be understood that the coupling may be easily disassembled by unscrewing the nut 20, sliding the metal rings 16 and 17 away from each other and from the bands 18 and 19, removing these bands by opening them on their hinges, and then sliding the rings 16 and 17 off the pipe ends after the latter have been moved out of alignment. The assembly of the coupling is effected in the reverse manner.

It will be observed from Fig. 1 that the outwardly extending flange 15' of the gasket 15 has an outer diameter equal to the inner diameter of the surrounding portion of the metal ring 17. Thus, the ring 17 serves to center the gasket 15 within the coupling and effect perfect alignment of the inner edge of the gasket with the inner walls of the pipes 10 and 11. This precise alignment of the parts, and the resulting smooth continuity of the flow passage through the pipes, are advantageous from the sanitation aspect, since there are no irregular surfaces or recesses acting to retain some of the material flowing through the pipes.

I claim:

In combination with a pair of pipes having adjacent end portions externally tapered away from each other, and an elastic sealing gasket interposed between said end portions, a coupling comprising a pair of rings surrounding the pipe end portions in spaced relation thereto and each ring having an internal taper generally complementary to the external taper of the pipe end portion which it surrounds, each ring being slidable over and off the enlarged end of the corresponding pipe, a resilient band interposed between the internal taper of each ring and the external taper of the corresponding pipe, each band being split to form opposed ends and having intermediate said ends a groove extending generally lengthwise of the pipes from edge to edge of the band to form an escape path for leakage between the sealing gasket and the corresponding pipe end, said groove of each band forming a weakened portion of the band constituting a hinge on which the band can be opened and closed around the corresponding pipe to permit the band to be applied to and removed from the pipe, and means for holding the rings together against the bands to clamp the pipe end portions against the sealing gasket.

References Cited in the file of this patent

UNITED STATES PATENTS

| Number | Name | Date |
| --- | --- | --- |
| 690,797 | Vail | Jan. 7, 1902 |
| 1,926,270 | Eastman | Sept. 12, 1933 |
| 1,928,259 | McCabe | Sept. 26, 1933 |
| 2,464,653 | Phipps | Mar. 15, 1949 |

FOREIGN PATENTS

| Number | Country | Date |
| --- | --- | --- |
| 497,110 | Great Britain | Dec. 13, 1938 |